US005396650A

United States Patent [19]

Terauchi

[11] Patent Number: 5,396,650

[45] Date of Patent: Mar. 7, 1995

[54] WIRELESS COMMUNICATION DEVICE WITH MULTI-FUNCTION INTEGRATED CIRCUIT PROCESSING CARD

[75] Inventor: Tohru Terauchi, Hyogo, Japan

[73] Assignee: Mitsubishi Denki Kabushiki Kaisha, Tokyo, Japan

[21] Appl. No.: 913,630

[22] Filed: Jul. 16, 1992

[30] Foreign Application Priority Data

Jul. 22, 1991 [JP] Japan .................................. 3-204579

[51] Int. Cl.[6] .................................... H04Q 3/02

[52] U.S. Cl. .................................. 455/38.2; 455/38.4; 455/344; 340/825.44

[58] Field of Search .................... 455/38.1, 38.2, 38.4, 455/89-90, 344, 74; 340/825.22, 825.54, 825.44; 379/357, 144

[56] References Cited

U.S. PATENT DOCUMENTS

| | | | |
|---|---|---|---|
| 5,001,775 | 3/1991 | Hayashi et al. | 455/186.1 |
| 5,049,874 | 9/1991 | Ishida | 340/825.44 |
| 5,109,540 | 4/1992 | Dzung et al. | 455/90 |
| 5,173,688 | 12/1992 | DeLuca et al. | 340/825.44 |

FOREIGN PATENT DOCUMENTS

| | | |
|---|---|---|
| 0434231 | 6/1991 | European Pat. Off. . |
| 3637684 | 5/1987 | Germany . |
| 9013213 | 11/1990 | WIPO . |

OTHER PUBLICATIONS

"Personal Telephone Services Using IC Cards"; Matsuo et al; *IEEE Communications Magazine*; Jul. 1989; pp. 41–48.

*Primary Examiner*—Edward F. Urban
*Assistant Examiner*—Andrew Faile
*Attorney, Agent, or Firm*—Rothwell, Figg, Ernst & Kurz

[57] ABSTRACT

Disclosed herein is a wireless device of the present invention, of a type wherein an external connecting terminal for electrically connecting an IC card having a function for processing various applications is disposed so as to be electrically connected to a controlling unit for carrying out the entire control of the wireless device. The controlling unit for performing the entire control of the wireless device can be replaced by an IC card having a function for carrying out the entire control of the wireless device.

3 Claims, 6 Drawing Sheets

WIRELESS COMMUNICATION DEVICE WITH MULTI-FUNCTION INTEGRATED CIRCUIT PROCESSING CARD

BACKGROUND OF THE INVENTION

1. Field of the Invention

The present invention relates to a wireless device such as a pocket bell for making a wireless call, and particularly to an improvement in the extension of a wireless calling function.

2. Description of the Prior Art

FIG. 1 is a block diagram showing a radio receiving set, i.e., a wireless device such as a conventional typical pocket bell, for making a wireless call. In the same drawing, there are shown an antenna 1 for receiving an incoming radio wave, a receiving unit 2 for analyzing the radio wave received by the antenna 1, and a demodulating unit 3 for demodulating the radio wave analyzed by the receiving unit 2 and converting it into information required for control of the wireless device.

Reference numeral 4 indicates a controlling unit for electrically processing the information thus converted and performing the entire control of the wireless device. Reference numeral 5 indicates a read-only memory (hereinafter called a "ROM") having software stored therein for causing the controlling unit 4 to effect a predetermined operation. In addition, designated at numeral 6 is a random-access memory (hereinafter called a "RAM") for causing the controlling unit 4 to record necessary data therein during its control operation.

Reference numeral 7 indicates a displaying unit for displaying given characters and symbols such as messages thereon under the control of the controlling unit 4. Reference numeral 8 indicates a tone generating unit for generating a calling tone used to give notice of a call to a user upon arrival of the call under the control of the controlling unit 4 in the same manner as described above. In addition, reference numeral 9 indicates an operating unit for inputting a signal for control such as a message retrieval to the controlling unit 4, and reference numeral 10 indicates a battery for supplying electric power to the wireless device.

The operation of the conventional wireless device will now be described. The antenna 1 receives an incoming radio wave and transfers it to the receiving unit 2. The receiving unit 2 analyzes the received radio wave and sends it to the demodulating unit 3. Afterwards, the demodulating unit 3 demodulates the radio wave analyzed by the receiving unit 2 and converts it into information required for control, followed by transfer to the controlling unit 4.

The controlling unit 4 compares "Identification" in the information converted by the demodulating unit 3 with "Identification" of the wireless device. If they coincide with each other, then the controlling unit 4 takes in the information converted by the demodulating unit 3. Next, the controlling unit 4 processes this information on the basis of the software stored in the ROM 5. Afterward, the controlling unit 4 energizes the tone generating unit 8 to produce a calling tone and display a message on the displaying unit 7 if the message is given.

For example, Japanese Patent Application Laid-Open No. 2-190036 is disclosed as a reference in which a technique relative to the conventional wireless device referred to above has been described.

Since the conventional wireless device is constructed as described above, it simply has a function for generating a calling tone and a function for displaying a message upon reception of the radio wave. With an increase in diversification of radio communications, the terms "whenever, wherever and whomever" are common to users. Thus, the conventional wireless device cannot meet present-day needs in terms of an increase in terminals having a plurality of pieces of additive value.

SUMMARY OF THE INVENTION

With the foregoing problems in view, it is an object of the present invention to provide a wireless device capable of providing a multifunctional service.

It is another object of the present invention to provide a wireless device capable of performing the calculation based on a desk calculating function and the retrieval of a telephone number based on a telephone-book retrieving function.

It is a further object of the present invention to provide a wireless device to which a calling tone can be automatically sent from a telephone terminal or the like.

It is a still further object of the present invention to provide a wireless device which can be designed in a small size and reduced in cost while providing performance superior to that of a conventional wireless device.

According to a first aspect of a wireless device of the present invention, an external connecting terminal for connecting an IC card having a function for processing various applications is mounted to a controlling unit for performing the entire control of the wireless device in order to achieve the above objects.

Further, according to a second aspect of a wireless device of the present invention, a controlling unit for carrying out the entire control of the wireless device is replaced by an IC card having a function for performing the entire control of the wireless device in order to achieve the above objects.

Furthermore, according to a third aspect of a wireless device of the present invention, a controlling unit for performing the entire control of the wireless device is replaced by an IC card having a function for effecting the entire control of the wireless device, and both a displaying unit and an operating unit are omitted, in order to achieve the above objects.

That is, a controlling unit employed in a wireless device of the present invention makes use of an application processing function of an IC card connected via an external connecting terminal to the controlling unit. It is therefore possible to provide a wireless device capable of carrying out calculations based on a desk calculating function and the retrieval of a telephone number based on a telephone-book retrieving function. In addition, the IC card used as an alternative to the controlling unit of the wireless device of the present invention performs the entire control of the wireless device. Therefore, a wireless device to which a calling tone can be automatically made from a telephone terminal or the like, can be realized by making use of information such as a message obtained upon control of the wireless device by the IC card.

The above and other objects, features and advantages of the present invention will become apparent from the following description and the appended claims, taken in conjunction with the accompanying drawings. However, the accompanying drawings are simply used for illustration and do not limit the scope of the present invention.

DETAILED DESCRIPTION OF THE PREFERRED EMBODIMENTS

Preferred embodiments of the present invention will hereinafter be described in detail with reference to the accompanying drawings.

First embodiment

Figure 1:
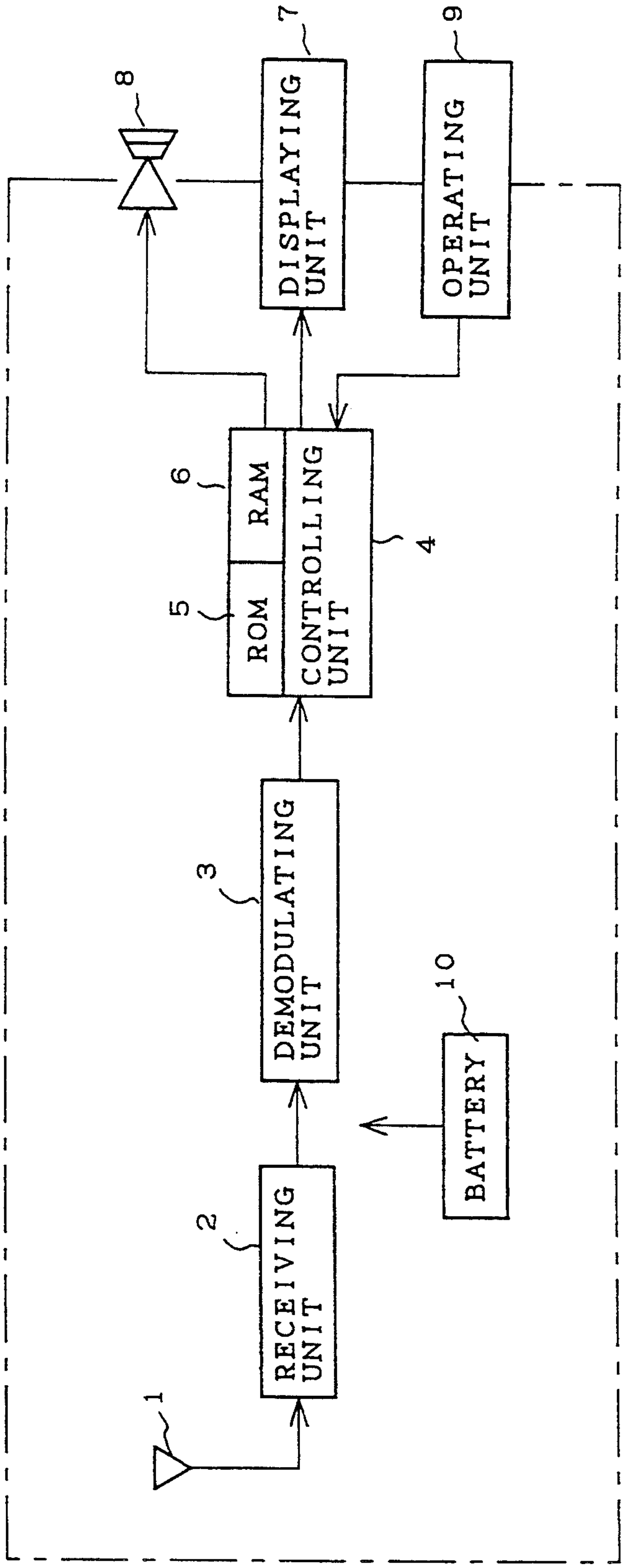
FIG. 1 (PRIOR ART)
FIG. 1 is a block diagram showing a conventional wireless device.
Figure 2:
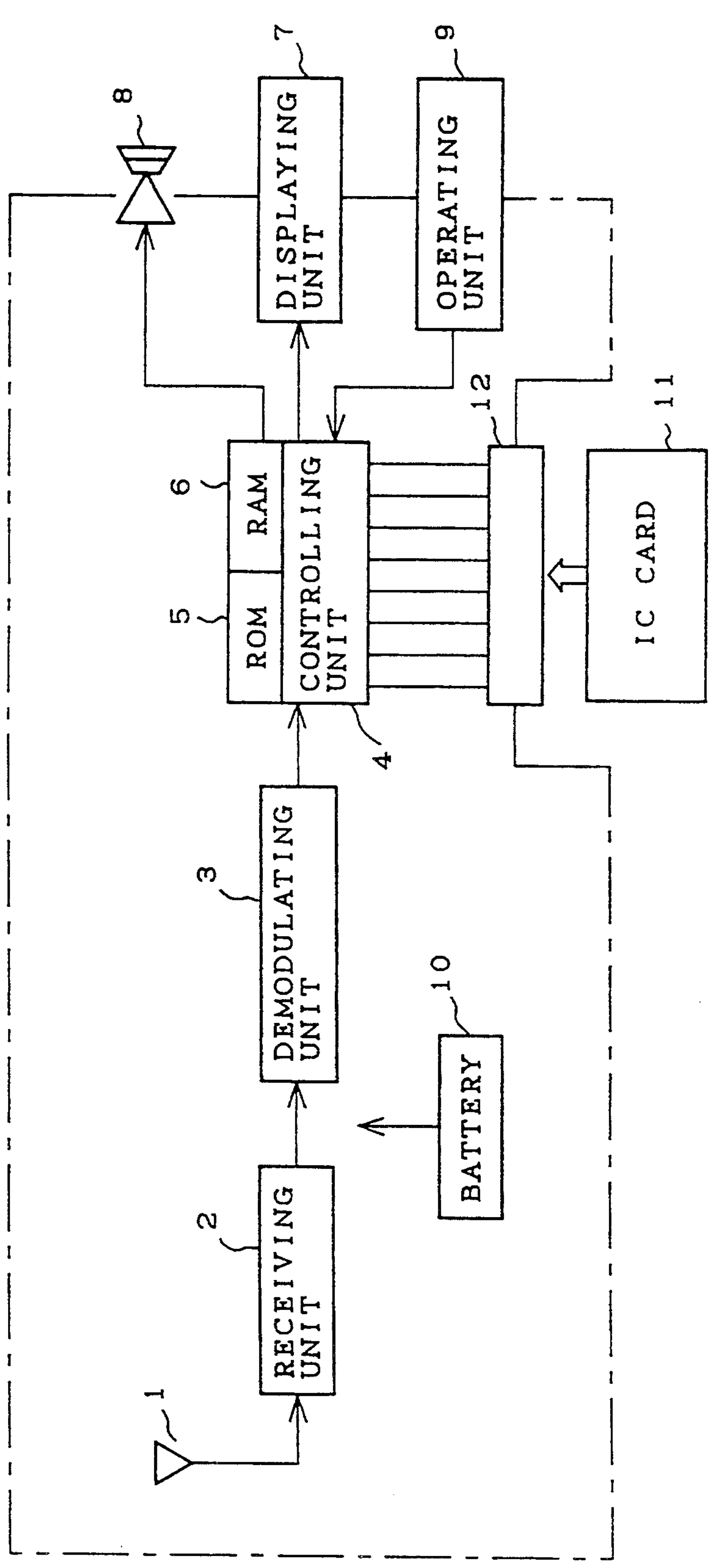
FIG. 2 is a block diagram illustrating a wireless device according to a first embodiment of the present invention.
Figure 3:
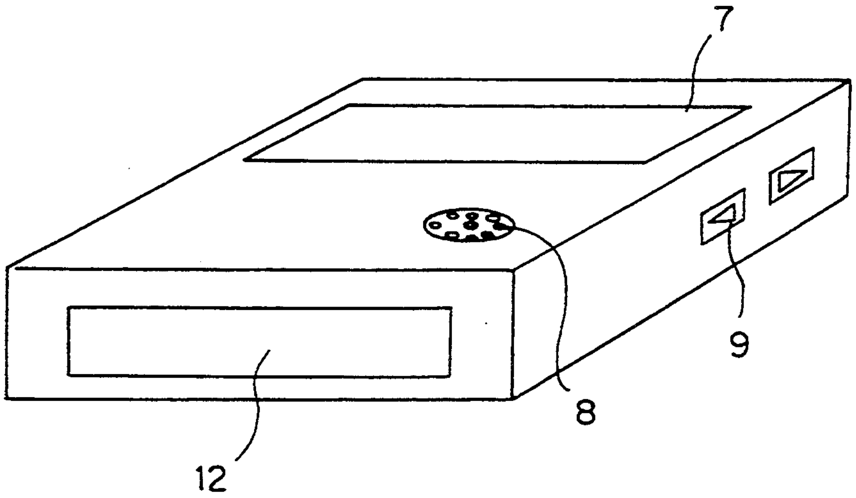
FIG. 3 is a perspective view depicting the exterior of the wireless device shown in FIG. 2.

FIG. 2 is a block diagram showing a radio receiving set, i.e., a radio or wireless device according to a first embodiment of the present invention. FIG. 3 is a perspective view of the exterior of the wireless device shown in FIG. 2. In the same drawing, there are shown an antenna 1, a receiving unit 2, a demodulating unit 3, a controlling unit 4, a ROM 5, a RAM 6, a displaying unit 7, a tone generating unit 8, an operating unit 9, and a battery 10. The components of the wireless device shown in FIG. 2 are identical or equivalent to those denoted by identical reference numerals in FIG. 1 and their detailed description will therefore be omitted.

Reference numeral 11 indicates an IC card having a function for processing various applications such as an electronic desk calculating function, a telephone-book retrieving function, etc., whereas reference numeral 12 indicates an external connecting terminal used to connect the IC card 11 to the controlling unit 4.

Incidentally, the operating unit 9 has a function for selecting any one of various applications of the IC card 11. The battery 10 is used to supply electric power to the IC card 11.

The operation of the wireless device will now be described. Incidentally, a wireless calling operation is identical to that of a conventional wireless device and its description will therefore be omitted. A description will be made principally of an application process using the IC card 11.

When a desired application is selected by a user who makes use of the wireless device, the IC card 11 having a function for processing the application is first inserted into the external connecting terminal 12. Then, the controlling unit 4 to which the IC card 11 has been connected via the external connecting terminal 12 displays various functions on the displaying unit 7 for processing different applications borne by the IC card 11.

The user controls the operating unit 9 while referring to the various functions displayed on the displaying unit 7 so as to select an intended application, thereby setting an operation mode to a process for the thus-selected application. When the selected application represents a desk calculating function, a desired calculation can be performed by the operating unit 9. When the selected application represents a telephone-book retrieving function, a desired telephone number can be retrieved by the operating unit 9.

Incidentally, the IC card 11 can be detachably mounted to the controlling unit 4 via the external connecting terminal 12. Therefore, the IC card 11 having various applications can be used, thereby making it possible to achieve a wireless device which can easily process various functions other than the wireless calling function and provide high additive value.

Second embodiment

Figure 5:
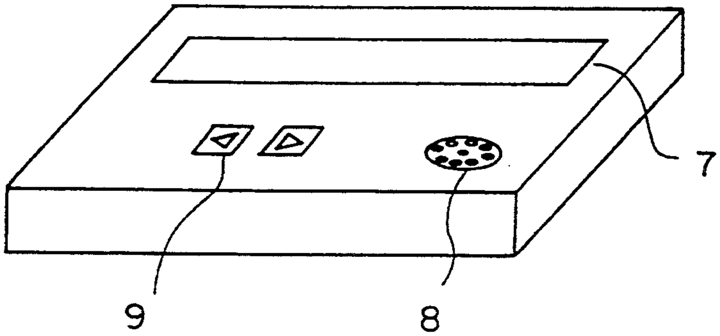
FIG. 5 is a perspective view depicting the exterior of the wireless device shown in FIG. 4 as seen from the top face thereof.
Figure 6:
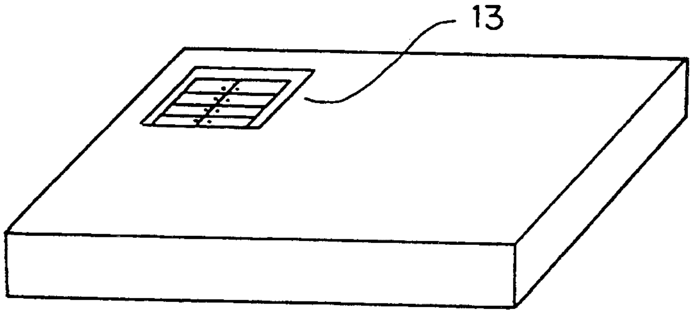
FIG. 6 is a perspective view illustrating the exterior of the wireless device of FIG. 4 as seen from the bottom face thereof.
Figure 4:
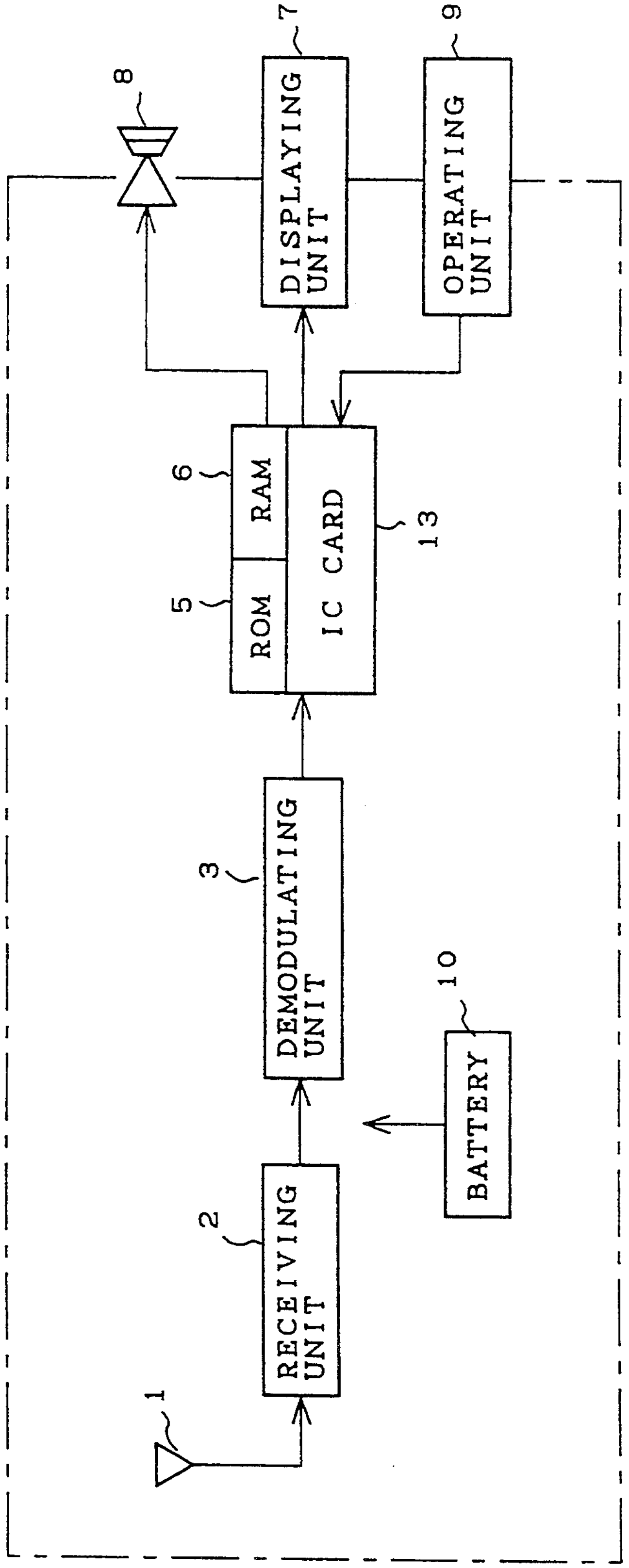
FIG. 4 is a block diagram showing a wireless device according to a second embodiment of the present invention.
Figure 7:
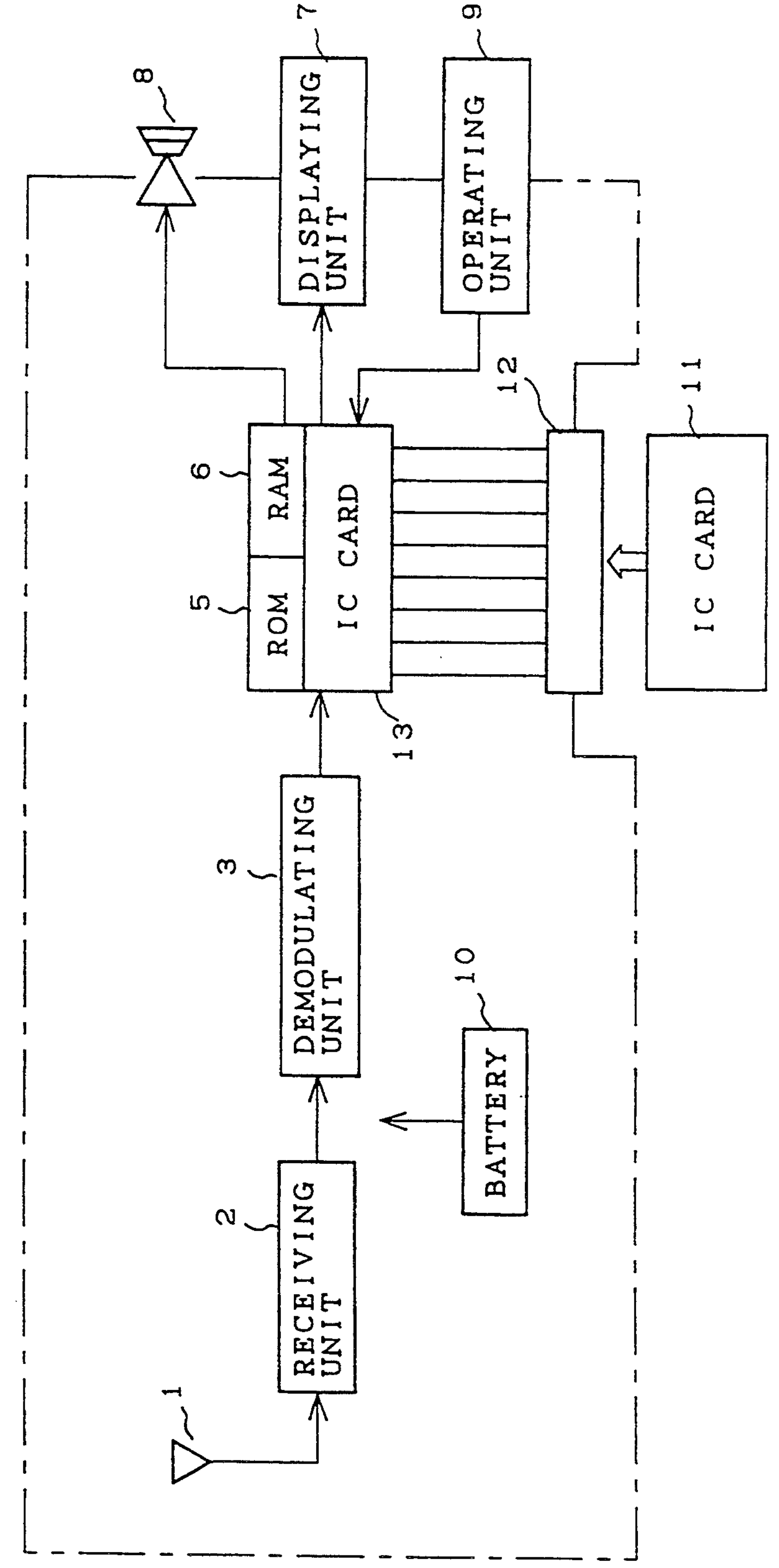
FIG. 7 is a block diagram showing a wireless device according to a third embodiment of the present invention.

FIG. 4 is a block diagram showing a wireless device according to a second embodiment of the present invention. FIG. 5 is a perspective view showing the above wireless device as seen from the top face thereof. FIG. 6 is a perspective view illustrating the above wireless device as seen from the bottom face thereof. The same elements of structure as those employed in each of the wireless devices shown in FIGS. 2 and 3 are identified by like reference numerals and the description of certain common elements will therefore be omitted.

In FIG. 4, reference numeral 13 indicates an IC card provided as an alternative to the controlling unit 4. The IC card 13 has a function for performing the entire control of the wireless device of a type wherein a wireless call is made based on information converted in the demodulating unit 3.

The operation of the wireless device will now be described. A radio wave received by the antenna 1 is analyzed by the receiving unit 2. Then, the radio wave thus analyzed is demodulated and converted into information required to control the wireless device by the demodulating unit 3, followed by transfer to the IC card 13. Afterwards, the IC card 13 detects that Identification in the converted information has coincided with Identification of the wireless device and takes in information about the result of detection, thereby generating a ringing or calling tone from the tone generating unit 8 or displaying messages on a displaying unit.

The IC card 13 has already stored therein a message received at the time of the wireless calling process. A wireless call can also be automatically sent to a corresponding called party based on a code included in the message stored therein.

That is, when a mechanism for holding the IC card 13 is mounted to a telephone terminal and the IC card 13 with the received message stored therein is inserted into the mechanism, information about the telephone number of the corresponding called party is automatically produced based on the code included in the message and a wireless call based on that information is automatically made from the telephone terminal.

Third embodiment

The above embodiments are directed to a case in which the conventional controlling unit 4 has been replaced by the IC card 13. However, an external connecting terminal 12 may be provided for electrically connecting an IC card 11 having a function for processing applications to the IC card 13 may be disposed. By inserting the IC card 11 into the connecting terminal 12, a wireless device capable of providing a function for processing various applications as well as the functions employed in the embodiments shown in FIGS. 4 through 6, can be realized.

Fourth embodiment

Figure 8:
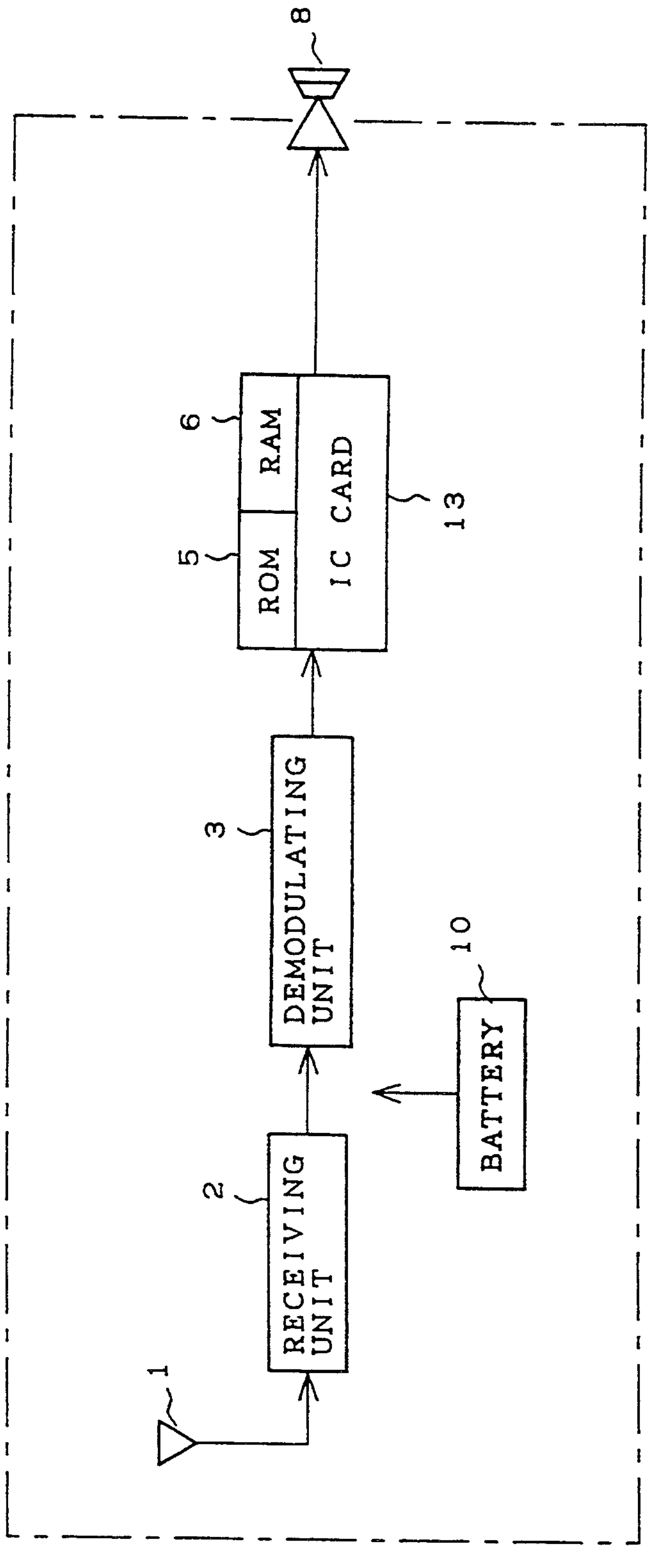
FIG. 8 is a block diagram depicting a wireless device according to a fourth embodiment of the present invention.

FIG. 8 is a block diagram showing a wireless device according to a fourth embodiment of the present invention. Reference numerals employed in FIG. 8 are identical or equivalent to those shown in FIG. 4.

In the present embodiment, the displaying unit 7 and the operating unit 9 are not provided. When a user who has recognized a wireless call from a calling tone generated by the tone generating unit 8 inserts the IC card 13 into an additionally-provided terminal or the like, the IC card 13 having the wireless calling function is activated.

According to a first aspect of a wireless device of the present invention, as described above, an external connecting terminal for connecting an IC card having a function for processing applications is provided so as to be connected to a controlling unit for performing the overall control of the wireless device. Therefore, the calculation based on a desk calculating function and the retrieval of a telephone number based on a telephone-book retrieving function can be performed by making use of the application processing function of the IC card connected via the external connecting terminal to the controlling unit, thereby making it possible to provide a wireless device which can meet various functions other than a wireless calling function and provide high additive value.

Further, according to a second aspect of a wireless device of the present invention, a controlling unit for performing the overall control of the wireless device is replaced by an IC card having a wireless calling function. Therefore, a wireless call or the like can be automatically made from a telephone terminal or the like by making use of a message or the like produced when the IC card is used as an alternative to the controlling unit and performs a wireless calling process, thereby making it possible to provide the wireless device which can meet a variety of functions other than a wireless calling function and provide high additive value.

Furthermore, according to a third aspect of a wireless device of the present invention, a controlling unit is replaced by an IC card having a wireless calling function. The wireless device is not provided with a displaying unit and an operating unit. Therefore, a wireless call can be automatically made from a telephone terminal or the like by making use of a message or the like obtained when the wireless call has been made. It is thus possible to provide a wireless device capable of meeting various functions other than a wireless calling function, providing high additive value, and achieving a further reduction in size and cost.

Having now fully described the invention, it will be apparent to those skilled in the art that many changes and modifications can be made without departing from the spirit or scope of the invention as set forth herein.

What is claimed is:

1. A mobile wireless communication device having multiple selectable functions, comprising:
   - a receiving unit for analyzing a modulated radio wave received by an antenna;
   - a demodulating unit for demodulating said analyzed modulated radio wave to derive a demodulated radio wave and for converting said demodulated radio wave into control information required for control of said wireless communication device;
   - a controlling unit for electrically processing said control information and performing the control of said wireless communication device in response to said control information;
   - a displaying unit for displaying predetermined characters and symbols thereon under the control of said controlling unit;
   - a tone generating unit for generating a calling tone under the control of said controlling unit;
   - an operating unit for inputting a controlling signal to said controlling unit;
   - an IC card having electronic processing functions; and
   - an external connecting terminal for electrically connecting said IC card to said controlling unit for connecting selected processing functions from said IC card to said controlling unit for processing selected applications through said controlling unit.

2. A mobile wireless communication device having multiple selectable functions, comprising:
   - a receiving unit for analyzing a modulated radio wave received by an antenna;
   - a demodulating unit for demodulating said analyzed modulated radio wave to derive a demodulated radio wave and for converting said demodulated radio wave into control information required for control of said wireless communication device;
   - an IC card having electronic processing functions and having a function for electrically processing said control information and performing the entire control of said wireless communication device;
   - a displaying unit for displaying predetermined characters and symbols thereon under the control of said IC card; and
   - a tone generating unit for generating a calling tone under the control of said IC card.

3. A mobile wireless communication device having multiple selectable functions, comprising:
   - a receiving unit for analyzing a modulated radio wave received by an antenna;
   - a demodulating unit for demodulating said analyzed modulated radio wave to derive a demodulated radio wave and for converting said demodulated radio wave into control information required for control of said wireless communication device;
   - an IC card having electronic processing functions and having a function for electrically processing said control information and performing the entire control of said wireless communication device; and
   - a tone generating unit for generating a calling tone under the control of said IC card.

* * * * *

UNITED STATES PATENT AND TRADEMARK OFFICE

CERTIFICATE OF CORRECTION

PATENT NO. : 5,396,650

DATED : March 7, 1995

INVENTOR(S) : Tohru Terauchi

It is certified that error appears in the above-indentified patent and that said Letters Patent is hereby corrected as shown below:

Column 5, line 4, "may be disposed" should be deleted.

Signed and Sealed this

Twenty-seventh Day of June, 1995

Attest:

Bruce Lehman

BRUCE LEHMAN

*Attesting Officer*

*Commissioner of Patents and Trademarks*